United States Patent
Crecelius et al.

(10) Patent No.: US 9,669,698 B2
(45) Date of Patent: Jun. 6, 2017

(54) ELECTRIC HYBRID DRIVE FOR RETROFITTING TO INTERNAL COMBUSTION VEHICLES

(71) Applicant: United Fleet Financing, LLC, Scottsdale, AZ (US)

(72) Inventors: David Crecelius, Fishers, IN (US); Peter Fischer, Indianapolis, IN (US); Jeff Ronning, Anderson, IN (US); Sean Stanley, Huntington, IN (US); John E. Waters, Fortville, IN (US)

(73) Assignee: Flagship Enterprise Center, Inc., Anderson, IN (US)

( * ) Notice: Subject to any disclaimer, the term of this patent is extended or adjusted under 35 U.S.C. 154(b) by 34 days.

(21) Appl. No.: 14/554,197

(22) Filed: Nov. 26, 2014

(65) Prior Publication Data

US 2015/0075884 A1    Mar. 19, 2015

Related U.S. Application Data

(63) Continuation of application No. 13/752,404, filed on Jan. 29, 2013, now abandoned.

(60) Provisional application No. 61/709,302, filed on Oct. 3, 2012.

(51) Int. Cl.
| | |
|---|---|
| *B60K 6/42* | (2007.10) |
| *B60W 10/06* | (2006.01) |
| *B60W 10/08* | (2006.01) |
| *B60K 6/40* | (2007.10) |
| *B60K 6/48* | (2007.10) |
| *B60W 20/10* | (2016.01) |

(52) U.S. Cl.
CPC ............. *B60K 6/42* (2013.01); *B60K 6/40* (2013.01); *B60W 10/06* (2013.01); *B60W 10/08* (2013.01); *B60W 20/10* (2013.01); *B60K 2006/4808* (2013.01); *B60Y 2304/076* (2013.01); *Y02T 10/626* (2013.01); *Y10S 903/93* (2013.01); *Y10S 903/951* (2013.01)

(58) Field of Classification Search
None
See application file for complete search history.

(56) References Cited

U.S. PATENT DOCUMENTS

| | | | | | |
|---|---|---|---|---|---|
| 3,387,312 | A | * | 6/1968 | Westphal | A47K 11/10 15/97.1 |
| 4,789,363 | A | * | 12/1988 | Wicklein | F01M 11/10 116/276 |
| 5,253,674 | A | * | 10/1993 | Argyle | G01N 17/00 116/206 |
| 5,382,355 | A | * | 1/1995 | Arlozynski | B01D 27/101 165/119 |
| 5,522,474 | A | * | 6/1996 | Burman | F01M 11/0458 141/98 |

(Continued)

*Primary Examiner* — Rami Khatib
*Assistant Examiner* — Jeffrey Boomer
(74) *Attorney, Agent, or Firm* — Barnes & Thornburg, LLP

(57) ABSTRACT

The subject invention is directed to a class of electric hybrid drives that can be retrofit easily to cars and trucks to reduce transportation costs. Certain embodiments include mechanisms for attachment to an existing powertrain, regenerative braking, on-the-road optimization of transportation costs depending on road and route conditions, or an operational mode in which motive power for a vehicle is solely derived from electric energy stored in a battery.

18 Claims, 6 Drawing Sheets

(56) References Cited

U.S. PATENT DOCUMENTS

| | | | |
|---|---|---|---|
| 6,298,759 B1* | 10/2001 | Herrscher | B23Q 39/044 82/122 |
| 6,892,537 B1* | 5/2005 | Hurwic | B60T 11/26 60/585 |
| 7,624,713 B2* | 12/2009 | Tawarada | G01F 23/02 123/196 R |
| 9,205,734 B1* | 12/2015 | Leach | B60K 6/405 |
| 2005/0205313 A1* | 9/2005 | Gilmore | B60K 6/26 180/65.21 |
| 2006/0000650 A1* | 1/2006 | Hughey | B60K 6/26 180/65.25 |
| 2007/0107957 A1 | 5/2007 | Lehrer | |
| 2007/0132423 A1* | 6/2007 | Ajima | H02P 6/10 318/719 |
| 2007/0175681 A1 | 8/2007 | King et al. | |
| 2007/0273228 A1 | 11/2007 | Tanaka et al. | |
| 2008/0029322 A1* | 2/2008 | Oba | B62D 25/12 180/84 |
| 2008/0092859 A1* | 4/2008 | Little | F02M 37/0064 123/557 |
| 2008/0173088 A1* | 7/2008 | Quill | F04B 51/00 73/323 |
| 2010/0044129 A1* | 2/2010 | Kyle | B60K 6/26 180/65.25 |
| 2010/0203777 A1* | 8/2010 | Bratel | B63H 21/20 440/3 |
| 2012/0056470 A1 | 3/2012 | Kim | |
| 2012/0194139 A1 | 8/2012 | Sasaki et al. | |
| 2012/0197473 A1 | 8/2012 | Kshatriya | |
| 2012/0209463 A1 | 8/2012 | Gibbs et al. | |
| 2012/0226406 A1 | 9/2012 | Kaita et al. | |
| 2012/0239237 A1 | 9/2012 | Hashimoto | |
| 2013/0091694 A1* | 4/2013 | Hussain | B60W 20/00 29/593 |
| 2013/0325207 A1* | 12/2013 | Gunther | B60K 6/48 701/2 |
| 2014/0095002 A1* | 4/2014 | Crecelius | B60K 6/40 701/22 |
| 2014/0353087 A1* | 12/2014 | Craft | F16H 57/0449 184/6.27 |
| 2015/0047166 A1* | 2/2015 | Lemieux | G02B 23/2476 29/402.04 |
| 2015/0049396 A1* | 2/2015 | Lemieux | G02B 23/2492 359/819 |
| 2015/0166050 A1* | 6/2015 | Frait | B60K 6/405 477/5 |
| 2015/0226289 A1* | 8/2015 | Klingston | B60L 7/12 74/661 |
| 2015/0318772 A1* | 11/2015 | Jahshan | H02P 23/00 318/400.41 |

* cited by examiner

ELECTRIC HYBRID DRIVE FOR RETROFITTING TO INTERNAL COMBUSTION VEHICLES

This application is a continuation of U.S. application Ser. No. 13/752,404, filed Jan. 29, 2013, which is entitled to the priority date of Oct. 3, 2012 for all material previously included in Provisional Application 61/709,302 for Crecelius et al., each of which is hereby incorporated by reference herein.

BACKGROUND OF THE INVENTION

The present disclosure relates generally to the technical field of hybrid electric vehicle systems. More specifically, it relates to electric hybrid drives for retrofitting a rotary electric motor/generator with or without regenerative braking capability to an existing internal combustion automotive vehicle. Still more specifically, it relates to the mechanical interface of an electric rotary electric motor/generator to the existing driveline of an existing internal combustion automotive vehicle.

Rising global fuel prices have improved business prospects for manufacturers of fuel-saving systems. In particular, fleet operators often use their internal combustion automotive vehicles for purposes (e.g., urban delivery) which greatly reduce their average fuel efficiency. Existing vehicles waste substantial fuel when they decelerate using friction brakes, and when operating the engine under conditions which lead to low efficiency. Existing vehicles are also limited to gasoline or diesel operation, which prevents operators from choosing the best alternative between alternate power sources for particular driving conditions. There is thus a need for an efficient, inexpensive, and flexible electric hybrid drive which can be retrofit to internal combustion vehicles to improve fleet operational costs.

The subject invention was developed to reduce transportation costs primarily for fleet operators, and to do so in a manner in which initial costs can be quickly repaid through savings. Objectives in the invention were to simplify installation of the electric hybrid drive onto existing vehicles, to design as simple and robust an electric hybrid drive as possible, and to enable a vehicle equipped with the subject invention to have a regenerative braking capacity—to slow the vehicle using the motor/generator to charge an on-board battery. The invention further allows optimization of engine operating conditions that increases overall efficiency. Also, the invention in certain embodiments allows a vehicle to be propelled using solely the stored energy of its on-board battery.

SUMMARY OF INVENTION

The subject invention is directed to a class of electric hybrid drives that can be retrofit easily to cars and trucks to reduce transportation costs. Certain embodiments include mechanisms for attachment to an existing powertrain, regenerative braking, on-the-road optimization of transportation costs depending on road and route conditions, or an operational mode in which motive power for a vehicle is solely derived from electric energy stored in a battery. Combinations of these embodiments are included in the subject invention, as are embodiments which exclude certain of the above features.

Certain aspects of the subject invention are set forth below. It should be understood that the aspects shown and discussed are not intended to limit or exhaust the scope of the invention.

DETAILED DESCRIPTION OF THE INVENTION

Figure 1:
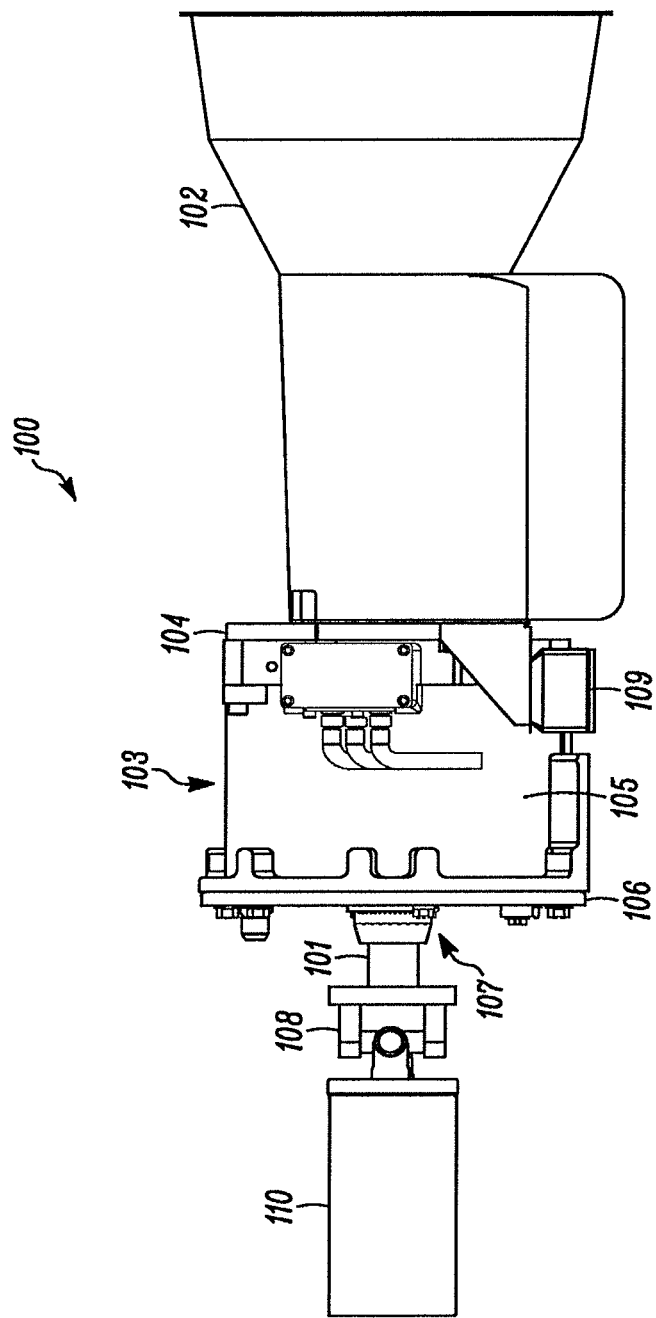
FIG. 1 shows a side view of an automotive powertrain fitted with an embodiment of the instant invention.

FIG. 1 shows the powertrain of an automotive vehicle converted into a retrofit electric hybrid vehicle according to a particular implementation of the present invention. An electric hybrid drive 100 is shown substituted for the extension housing of transmission 102. Slip yoke 101 engages output shaft 400 (of FIG. 4a) of transmission 102. Motor/generator housing 103 comprises adapter element 104, housing element 105, and motor/generator housing cover 106. Slip yoke seal 107 prevents leakage of transmission fluid around slip yoke 101.

In preferred embodiments, any or all of slip yoke 101, slip yoke seal 107, universal joint 108, and propeller shaft 110 can be those elements original with the automotive vehicle. They can be reused without modification or with modification. However, a different embodiment can comprise any or all of a new slip yoke, a new slip yoke seal, a new universal joint, and a new propeller shaft.

A cross-member mount 109 that in some embodiments will assist in anchoring motor/generator housing 103 to the existing drivetrain is also shown. In the embodiment shown, the electric hybrid drive and the existing transmission output shaft automatically rotate together at the same rotational velocity to provide power and torque to propeller shaft 110.

Figure 2:
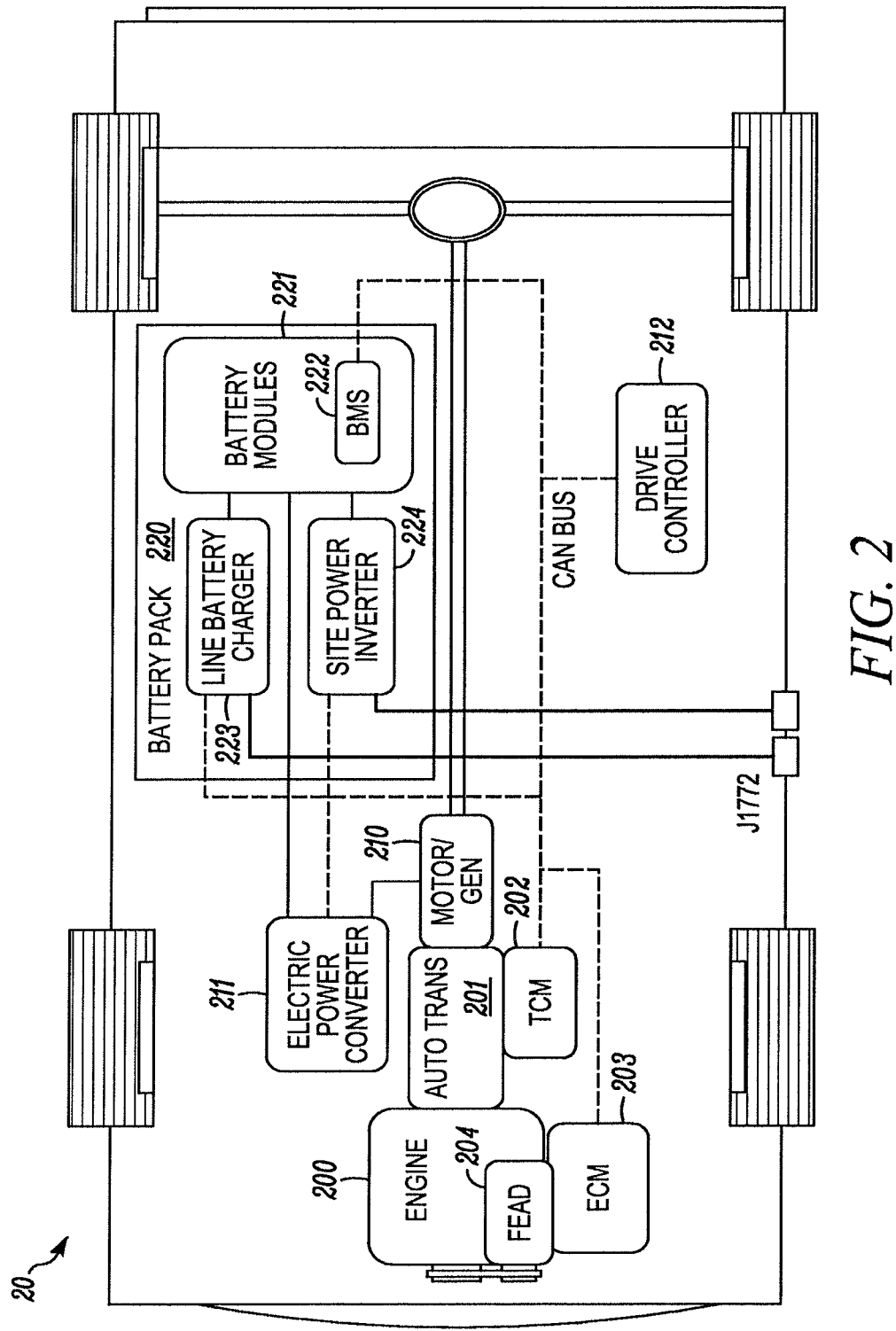
FIG. 2 shows a schematic view of the operational system of an embodiment of the instant invention.

FIG. 2 shows an electric hybrid drive schematic of a particular embodiment of the present invention 20 is an automotive vehicle in which the present invention has been installed. OEM elements of the original automotive vehicle kept in the installation comprise engine 200, automatic transmission 201, transmission control module 202, engine control module 203 and front end accessory drive 204. Add-on elements added to the original automotive vehicle comprise rotary electric motor/generator 210, electric power converter 211, drive controller 212, and battery pack 220.

In some embodiments of the electric hybrid drive, it will be beneficial to add an alternator onto the accessory drive of the engine, to provide alternator electric power output to aid in charging battery pack 220.

Figure 4A:
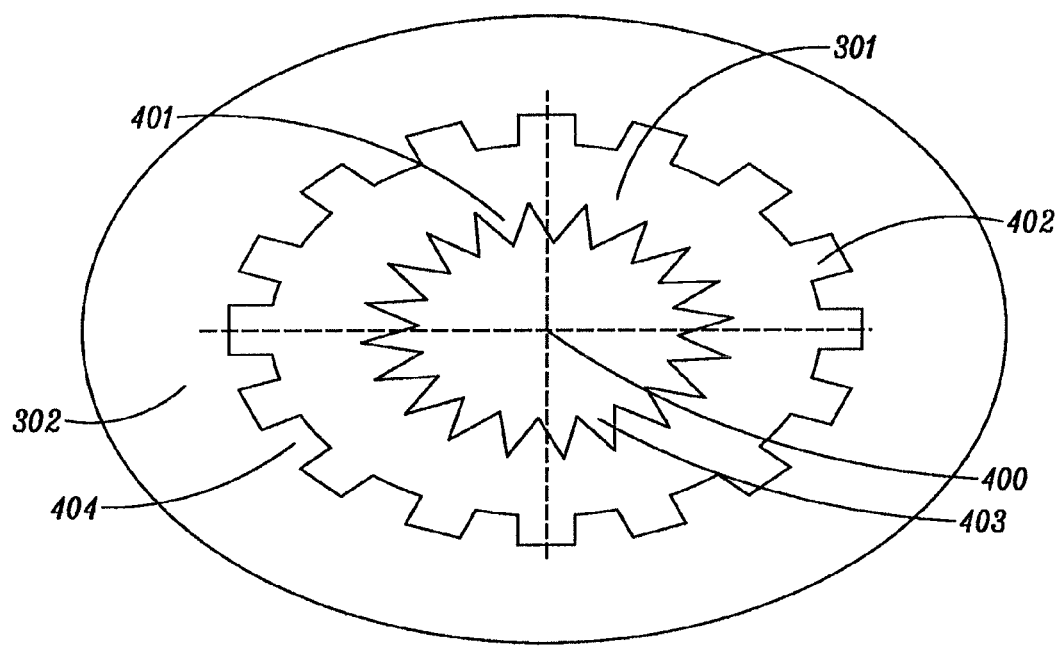
FIG. 4a shows an end view of transfer shaft 301 according to an implementation of the instant invention.

Rotary electric motor/generator 210 is mounted coaxially to output shaft 400 (of FIG. 4a) of automatic transmission 201. The rotary electric motor/generator is functionally connected to the output shaft of the automatic transmission by means of a transfer shaft 301 (FIG. 4a). In various implementations, this rotary electric motor/generator can be powered by DC electric power or by AC electric power. In various implementations, rotary electric motor/generator 210 can be a permanent magnet, induction, switched reluctance, brushed DC, wound field synchronous, synchronous motor/generator, or another type of motor/generator with similar characteristics. In a preferred embodiment, rotary electric motor/generator 210 comprises a position feedback sensor, which reports the position and/or rotational speed of the shaft of the rotary electric motor/generator to drive controller 212. More preferably, the position feedback sensor is integrated into rotary electric motor/generator 210.

In a preferred embodiment, rotary electric motor/generator 210 also is able to function as an electric generator. When the battery supplies electric power to the rotary electric motor/generator, it supplies battery electric power output and the rotary electric motor/generator receives motor electric power input converted from the battery electric power output by the electric power converter. When the rotary electric motor/generator acts as a generator charging the battery pack, it produces generator electric power output which is converted by the electric power converter into charging electrical power input used to charge the battery pack.

Particular embodiments of the operation of the electric power converter during the process of driving the rotary electric motor/generator as a motor include: i) the electric power converter acting to convert the DC battery electric power output into variable-frequency AC motor electric power input; ii) the electric power converter acting to convert the DC battery electric power output voltage into DC motor electric power input having a different voltage; iii) the electric power converter acting to convert the DC battery electric power output into pulse-width modulated motor electric power input; and iv) when the battery electric power output and the motor electric power input have substantially the same voltage.

In a preferred implementation, rotary electric motor/generator 210 can be used to convert electric power from battery pack 220 into additional torque at the nominal rotational speed of the output shaft of the automatic transmission, and to convert torque as supplied by engine 200 and automatic transmission 201 into electrical power to charge the battery pack. However, a system lacking the ability to charge the battery pack from power supplied by engine 200 and automatic transmission 201 is still considered within the scope of the instant invention.

Particular embodiments of the operation of the electric power converter during the process of charging the battery pack comprise: i) the electric power converter acting to convert variable-frequency AC generator electric power output into charging electric power input, and ii) the electric power converter acting to convert DC generator electric power output voltage into charging electric power input having a different voltage.

Drive controller 212 coordinates the operation of the electrical hybrid drive. The coordination comprises controlling rotary electric motor/generator 210 to supply additional torque to the output shaft of the automatic transmission when desired. In a preferred embodiment, additional torque is provided during acceleration of vehicle 20.

The coordination can also comprise controlling rotary electric motor/generator 210 to remove torque from the transmission output shaft when desired, thereby slowing the vehicle. In a preferred embodiment, rotary electric motor/generator 210 charges battery pack 220 at least during braking of vehicle 20, providing thereby the capacity of regenerative braking. Regenerative braking can be applied with various braking profiles, e.g., immediate full braking, a gentle initial application growing to a desired level, moderate braking at all speeds, and so on. In various implementations, the instant drive comprises at least one user control element allowing a user to control the braking profile of the drive.

The drive controller can also comprise at least one user control element controlling a drive characteristic, e.g., fast starts using the full torque of the rotary electric motor/generator, gentle starts followed by gradually increasing additions of torque from the rotary electrical motor/generator, and so on.

The drive controller comprises a communications network to communicate data and control instructions between the various components of an electric hybrid drive. The communications network can comprise the controller area network of the original automotive vehicle for communication of data and control instructions, a dedicated electrical hybrid drive communications network, or a combination of the two. The communications network can also comprise means for providing user commands and settings.

The drive controller comprises a digital, analog, or hybrid computer programmed so as to accept electric hybrid drive data and issue electric hybrid drive control instructions in such a manner to operate the electric hybrid drive. In a particular embodiment, the drive controller semi-automatically determines control instructions based at least on the current state of the electric hybrid drive and on operator inputs. In another embodiment, the drive controller automatically determines control instructions based at least on the current state of the electric hybrid drive and the conventional driving controls of vehicle 20.

Rechargeable battery pack 220 comprises battery modules 221 and battery management system 222. Battery modules 221 comprise rechargeable electric batteries suited to the desired performance of the electric hybrid drive. Additional considerations, such as the ratio of low-speed operation to high-speed operation, or city center versus suburban versus rural operations, may also inform the choice of the storage capacity of battery modules 221.

Battery modules 221 can beneficially comprise more than one type of battery. For example, for some applications a combination of high-power batteries and high-capacity batteries may provide better system capabilities than modules built from only one type of battery.

Battery management system 222 provides a power conditioning interface between battery modules 221 and electrical inputs to and outputs from those modules. For example, some batteries have extended lifespan if charged using pulsed current rather than continuous current. Others charge best if the amount of charging current is above, below, or in the vicinity of a given set point. Similarly, most batteries charge most effectively if the charging voltage is maintained between a minimum and a maximum charging voltage. In many cases, the rate at which energy is drained from a battery must be limited to maintain, e.g., proper battery temperature.

Battery management system 222 can comprise any of these functions, as well as others that may be required to effectively use a particular type of batteries in the battery modules. Battery management system 222 can beneficially comprise sensors to monitor the condition (e.g., voltage, current, temperature, etc.) of the battery modules 221 and/or of the individual batteries contained by the battery modules.

The electric hybrid drive can also comprise a line battery charger 223, thereby enabling charging of battery modules 221 from an external source of electricity. This converts vehicle 20 into a plug-in hybrid, with the capability of beginning a route with fully charged battery modules. This capability would be useful for improving mileage over a long-distance route comprising lots of highway driving, or a route that includes lots of uphill driving early on.

The electric hybrid drive can also comprise a site power inverter 224, providing a source of AC power converted from energy stored in the battery pack at a work site without requiring that engine 200 be running. It is common for fleet vehicles to be driven to a work site and largely parked during a working period. In many remote locations, having a clean and silent source of electricity for tools is a desirable capability which can be served by site power inverter 224.

Figure 3:
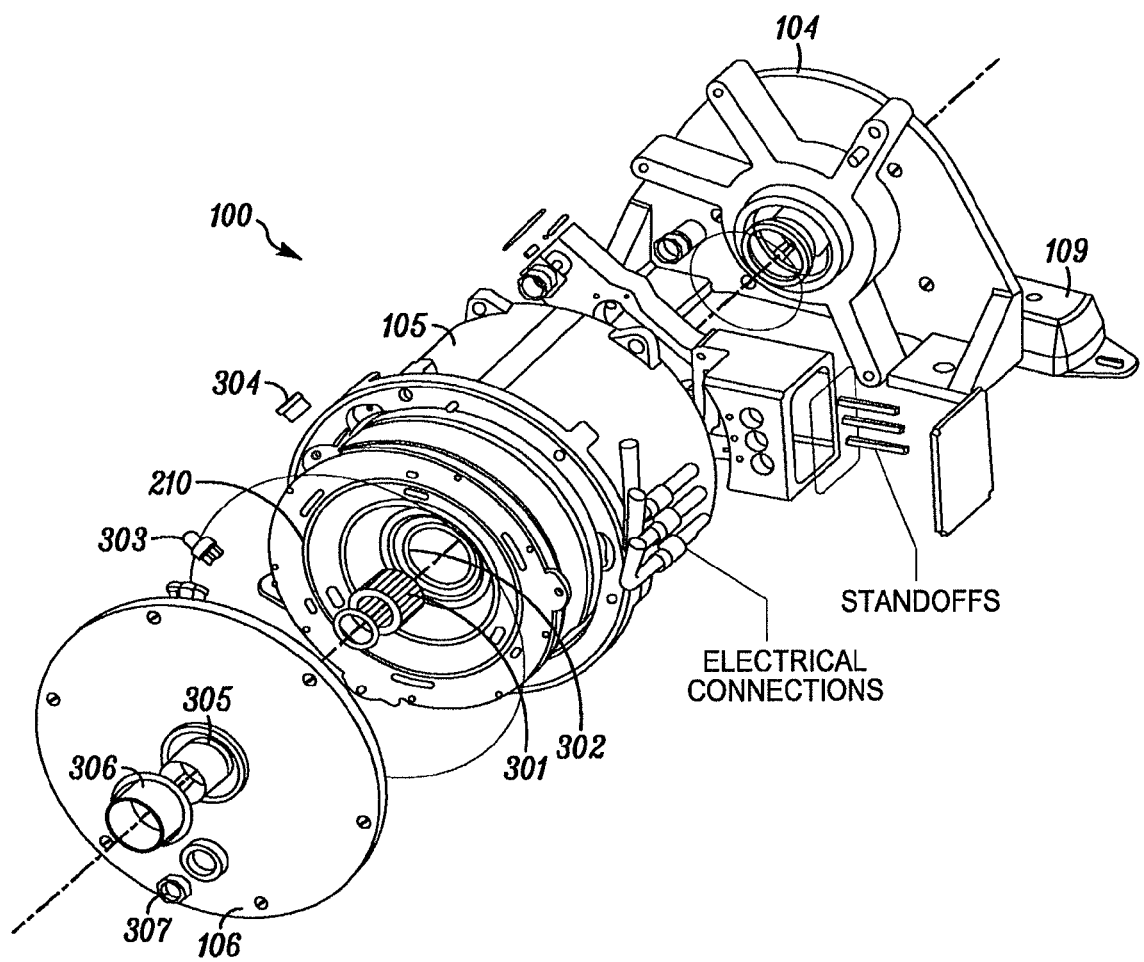
FIG. 3 shows an exploded view of an implementation of the electric hybrid drive.

FIG. 3 shows details of an electric hybrid drive 100 according to a preferred embodiment of the instant invention. Adapter element 104, housing element 105, and motor/generator housing element 106 of motor/generator housing 103 appear in an exploded view, but in the same relationship as in FIG. 1. Rotary electric motor/generator 210 in the implementation illustrated in FIG. 3 is a coaxial rotary electric motor/generator having a driven rotating shaft 302 with a coaxial cylindrical aperture having splines disposed along the inner surface of said aperture.

The driven rotating shaft 302 of rotary electric motor/generator 210 is functionally coupled to the output shaft 400 of the automatic transmission by transfer shaft 301. Shown in detail in FIG. 4, transfer shaft 301 in this implementation comprises a hollow cylinder comprising inner grooves disposed on the inside surface of the shaft so as to couple with a set of splines on the output shaft of the automatic transmission. Transfer shaft 301 further comprises outer grooves disposed on the external surface of the shaft so as to couple with the splines on the hollow output shaft 302 of rotary electric motor/generator 210. The net effect is that, when assembled, the output shaft of the automatic transmission and the driven rotating shaft 302 are locked together in rotation. In another embodiment of the instant invention, the driven rotating shaft 302 of rotary electric motor/generator 210 meshes properly with the transmission output shaft 400 of the automatic transmission so that no transfer shaft is required. It will be clear to one skilled in the art that the means for transferring torque can include a coaxial speed matcher, such as a set of planetary gears. A variety of direct-drive couplings are also well suited for transferring torque between the driven rotating shaft and the transmission output shaft.

In a particular embodiment, rotary electric motor/generator 210 requires liquid cooling. For this purpose cooling fluid fittings 303 circulate automatic transmission fluid through the rotary electric motor/generator. The level of the cooling fluid can be monitored visually through cooling fluid viewport 307. Coolant access port 304 provides access to the motor/generator coolant.

In a preferred embodiment, the original slip yoke 101 of the automotive vehicle 20 is used in the retrofit electric hybrid vehicle. The original bearing supporting the slip yoke, however, is typically removed along with the extension housing of the transmission 102. The original bearing supporting the slip yoke is replaced by slip yoke bearing 305, which is then sealed around the original slip yoke by slip yoke seal 306.

Figure 4B:
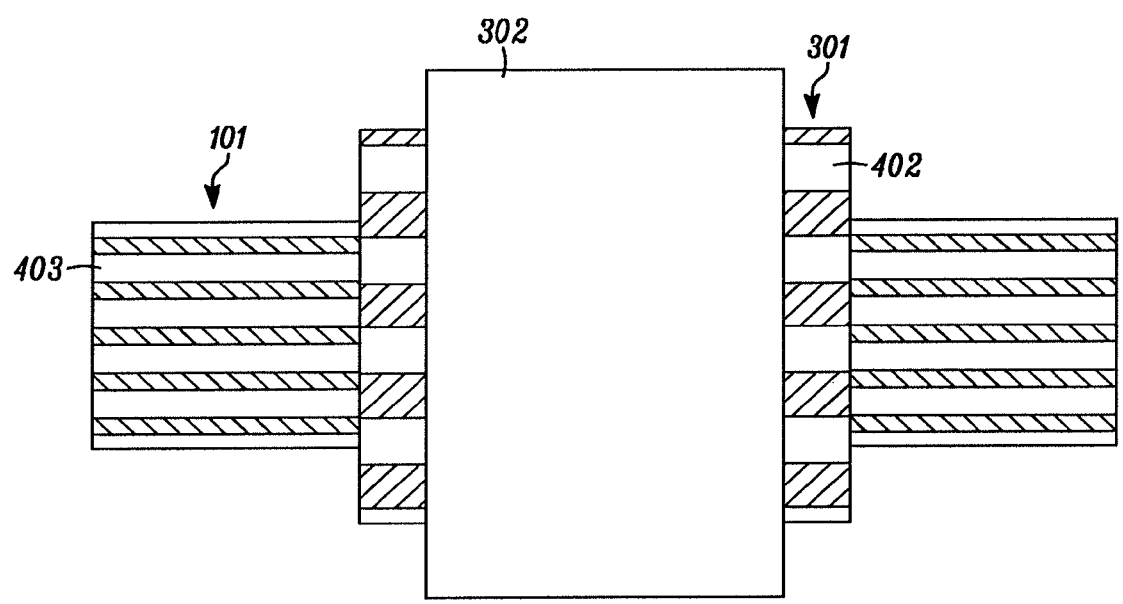
FIG. 4b shows a side view of transfer shaft 301 according to an implementation of the instant invention.

FIGS. 4a and 4b show details of transfer shaft 301. The transfer shaft 301 rotationally couples hollow output shaft 302 of rotary electric motor/generator 210 to output shaft 400 of the automatic transmission so that all three elements rotate together. In a particular embodiment, this is accomplished by providing transfer shaft 301 with internal splines 401 and external splines 402 that mesh, respectively, with transmission output shaft splines 403 and rotating shaft splines 404. The shape of the internal splines 401 and the external splines 402 are chosen to function properly within a particular embodiment of the instant invention.

Figure 5:
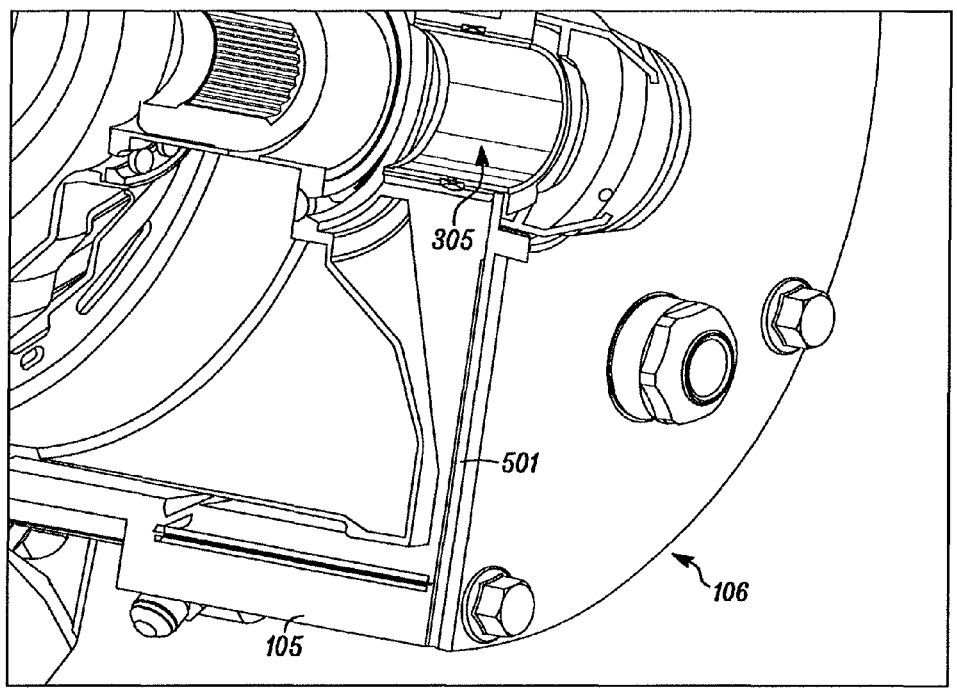
FIG. 5 shows an internal lubrication channel directing cooling fluid to the slip yoke bearing.

Lubrication for the slip yoke bearing 305 is originally provided from the internal structure of the automatic transmission 102 by any of a number of designs, e.g., a splash-lube system. In some embodiments of the instant invention, this source of lubrication may be blocked by rotary electric motor/generator 210 and its housing. In a particular embodiment of the instant invention, the automatic transmission fluid used for cooling rotary electric motor/generator 210 is also directed to slip yoke bearing 305 for purposes of lubrication. In a further embodiment as illustrated in FIG. 5, the automatic transmission fluid is routed from the cooling fluid fittings 303 through an internal lubrication channel 501 within housing element 105 and motor/generator housing cover 106 to slip yoke bearing 305.

While the foregoing written description of the invention enables one of ordinary skill to make and use what is considered to be the best mode thereof, those of ordinary skill will also understand and appreciate the existence of variations, combinations, and equivalents of the specific embodiment, method, and examples herein. The invention is therefore not intended to be limited by the above described embodiments, methods, and examples, but by all embodiments and methods within the scope and spirit of the invention as claimed below.

The invention claimed is:

1. An electric hybrid drive for retrofitting to internal combustion automobiles that include an internal combustion engine, a transmission with a transmission case and a transmission output shaft, the electric hybrid drive comprising:
 a rotary electric motor/generator comprising a driven rotating shaft pierced coaxially along an axis of rotation of the driven rotating shaft, said pierced shaft having a sufficiently large aperture for the transmission output shaft to pass through, and at least one of a rotary position sensor or a tachometric sensor, the motor/generator being mounted to an automobile so that the driven rotating shaft is coaxial with the transmission output shaft, and so that the motor/generator is substantially fixed at a first end with respect to the transmission case, torque being transferred between the driven rotating shaft and the transmission output shaft, wherein the motor/generator has a cooling fluid fitting adjacent a second end opposite the first end and spaced from the driven rotating shaft;
 a cooling system comprising a cooling fluid that cools the rotary electric motor/generator via circulation through the cooling fluid fitting, wherein the cooling fluid comprises automatic transmission fluid;
 a slip yoke bearing coupled to the rotary electric motor/generator;
 a rechargeable battery pack to provide battery electric power output,
 a line battery charger to accept charging electric power;
 an electric power converter functionally connected to the rechargeable battery pack and the rotary electric motor/generator, comprising motor driving circuitry that converts battery electric power output from the rechargeable battery pack into motor electric power input to the rotary electric motor/generator;
 additional sensors that produce sensor data describing the current operating condition of the drive; and
 a drive controller that acquires all sensor data and that generates and sends control signals to the rotary electric motor/generator, wherein the rotary electric motor/generator and slip yoke bearing are sized to occupy a space previously occupied by a transmission extension housing.

2. The electric hybrid drive of claim 1, wherein the electric power converter further comprises battery charging circuitry that converts generated electric power output from the motor/generator into charging electric power input for the rechargeable battery pack.

3. The electric hybrid drive of claim 1, wherein torque is transferred between the driven rotating shaft and the transmission output shaft by a set of planetary gears.

4. The electric hybrid drive of claim 1, wherein torque is transferred between the driven rotating shaft and the transmission output shaft by a direct-drive coupling.

5. The electric hybrid drive of claim 1, wherein the aperture of the driven rotating shaft defines an inner cylindrical surface thereon.

6. The electric hybrid drive of claim 5, wherein the inner cylindrical surface of the driven rotating shaft further comprises internal splines disposed thereon so that the internal splines mesh with splines of the transmission output shaft.

7. The electric hybrid drive of claim 1, torque is transferred between the driven rotating shaft and the transmission output shaft by a transfer shaft that substantially prevents relative rotation of the driven rotating shaft and the transmission output shaft.

8. The electric hybrid drive of claim 7, wherein the transfer shaft comprises a cylindrical transfer tube having external splines which mesh with internal splines disposed on the driven rotating shaft.

9. The electric hybrid drive of claim 8, wherein the cylindrical transfer tube further comprises internal splines which mesh with splines of the transmission output shaft.

10. The electric hybrid drive of claim 1, wherein the slip yoke bearing is lubricated with the cooling fluid.

11. The electric hybrid drive of claim 1, wherein the motor/generator is mounted to the automobile by a motor/generator housing attached to the transmission case.

12. The electric hybrid drive of claim 11, wherein the motor/generator housing comprises an adapter element bolted onto the transmission case.

13. The electric hybrid drive of claim 11, wherein a buried lubrication channel within the motor/generator housing directs lubricant to the slip yoke bearing.

14. The electric hybrid drive of claim 1, wherein the line battery charger generates charging electrical power input from an external electrical source.

15. The electric hybrid drive of claim 1, further comprising a site power inverter that converts battery electric power output into mains power.

16. The electric hybrid drive of claim 1, wherein the electric power converter further comprises a regenerative braking mode.

17. The electric hybrid drive of claim 16, wherein the drive controller comprises at least one user control element allowing a user of the drive to control the braking profile of regenerative braking of the retrofitted internal combustion automobile.

18. The electric hybrid drive of claim 1, wherein the drive controller comprises at least one user control element allowing a user of the drive to control the relative proportions of torque transferred to the transmission output shaft from the rotary electric motor/generator and from the internal combustion engine.

* * * * *